(12) United States Patent
   Maier (10) Patent No.: US 10,587,083 B2
(45) Date of Patent: Mar. 10, 2020

(54) INTERFACE ASSEMBLY THAT CONNECTS A PERIPHERAL DEVICE TO AN INTERFACE OF A HOST SYSTEM, AN ELECTRONIC DEVICE AND A METHOD OF SIGNALING

(71) Applicant: Fujitsu Technology Solutions Intellectual Property GmbH, München (DE)

(72) Inventor: Andreas Maier, München (DE)

(73) Assignee: Fujitsu Technology Solutions Intellectual Property GmbH, München (DE)

( * ) Notice: Subject to any disclaimer, the term of this patent is extended or adjusted under 35 U.S.C. 154(b) by 0 days.

(21) Appl. No.: 15/728,964

(22) Filed: Oct. 10, 2017

(65) Prior Publication Data
   US 2018/0102618 A1    Apr. 12, 2018

(30) Foreign Application Priority Data
   Oct. 12, 2016   (DE) .......................... 10 2016 119 446

(51) Int. Cl.
   *H01R 29/00*    (2006.01)
   *G06F 13/38*    (2006.01)
   (Continued)

(52) U.S. Cl.
   CPC ........... *H01R 29/00* (2013.01); *G06F 13/385* (2013.01); *G06F 13/4022* (2013.01);
   (Continued)

(58) Field of Classification Search
   CPC .... G06F 13/4282; G06F 13/385; G06F 1/266; G06F 13/4022; G06F 1/3287;
   (Continued)

(56) References Cited

U.S. PATENT DOCUMENTS 5,884,086 A    3/1999  Amoni et al.
6,173,160 B1*  1/2001  Liimatainen ......... H03G 3/3047
                                                      455/67.11

(Continued)

OTHER PUBLICATIONS

"Is USB digital or analog?", Jan. 17, 2018, Quora.com, p. 1, retrieved from the internet on Jan. 9, 2019 at <https://www.quora.com/Is-USB-digital-or-analog>.*

(Continued)

*Primary Examiner* — Faisal M Zaman
(74) *Attorney, Agent, or Firm* — DLA Piper LLP (US)

(57) ABSTRACT

An interface assembly of a host system that connects a peripheral device to a USB Type-C interface has at least one supply line and at least one signaling line, wherein one from among a plurality of different power profiles can be selected by the peripheral device by applying different analog control signals to the signaling line, a signaling circuit connects to the signaling line on a side of the host system, the signaling circuit, on the basis of at least one digital control signal, produces a predetermined analog control signal assigned to the at least one digital control signal and outputs it to the peripheral device via the signaling line and the at least one digital control signal is provided via a GPIO port of a control module of a system component of the host system, and the GPIO port is controlled by a BIOS.

16 Claims, 4 Drawing Sheets

(51) Int. Cl.
*G06F 13/40* (2006.01)
*G06F 13/42* (2006.01)
*H01R 24/64* (2011.01)
*H01R 107/00* (2006.01)

(52) U.S. Cl.
CPC .......... *G06F 13/4282* (2013.01); *H01R 24/64* (2013.01); *H01R 2107/00* (2013.01); *H01R 2201/06* (2013.01); *Y02D 10/14* (2018.01); *Y02D 10/151* (2018.01)

(58) Field of Classification Search
CPC .. G06F 13/4068; G06F 13/4081; G06F 1/263; G06F 1/3296; G06F 13/382; G06F 1/3253; G06F 1/3278; H02J 2007/0062
USPC ............................ 710/104, 313, 14, 304, 300
See application file for complete search history.

(56) References Cited

U.S. PATENT DOCUMENTS

| | | | | |
|---|---|---|---|---|
| 2002/0184429 | A1* | 12/2002 | Chang | G06F 13/4004 710/313 |
| 2004/0066211 | A1* | 4/2004 | Herz | H04L 25/028 326/30 |
| 2004/0156151 | A1 | 8/2004 | Morrow | |
| 2005/0120250 | A1 | 6/2005 | Adachi | |
| 2005/0243184 | A1* | 11/2005 | Fink | G08C 15/00 348/222.1 |
| 2006/0136154 | A1* | 6/2006 | Bliley | G06F 1/28 702/58 |
| 2008/0192398 | A1* | 8/2008 | Inoue | G05F 1/56 361/103 |
| 2009/0193156 | A1* | 7/2009 | Suematsu | G06F 1/266 710/14 |
| 2009/0210637 | A1* | 8/2009 | Yung | G06F 13/385 711/154 |
| 2009/0228833 | A1* | 9/2009 | Nakayama | H04N 1/00236 715/810 |
| 2010/0271520 | A1* | 10/2010 | Nakayama | H03M 1/06 348/302 |
| 2010/0277145 | A1* | 11/2010 | Krishna | G06F 13/4022 323/282 |
| 2012/0110217 | A1* | 5/2012 | Christiansen | G06F 11/349 710/15 |
| 2013/0031392 | A1* | 1/2013 | McLane | G06F 1/3278 713/323 |
| 2013/0297958 | A1* | 11/2013 | Siegel | G06F 1/325 713/323 |
| 2014/0361916 | A1* | 12/2014 | Wolfs | H03M 1/185 341/155 |
| 2015/0142203 | A1* | 5/2015 | Roth | G01K 7/16 700/299 |
| 2016/0094071 | A1* | 3/2016 | Nge | H02J 7/0052 320/107 |
| 2016/0124488 | A1* | 5/2016 | Haentzschel | G06F 1/3253 713/323 |
| 2016/0197490 | A1* | 7/2016 | Hirose | H02J 5/005 307/104 |
| 2017/0293335 | A1* | 10/2017 | Dunstan | G06F 1/266 |

OTHER PUBLICATIONS

Universal Serial Bus Specification, Revision 1.1, Sep. 23, 1998, pp. 113 and 256.*
Universal Serial Bus Specification, Revision 2.0, Apr. 27, 2000, pp. 120-121.*
Universal Serial Bus Type-C Cable and Connector Specification, Revision 1.0, Aug. 11, 2014, USB 3.0 Promoter Group, pp. 107-112.*
Fairchild Semiconductor Corporation: FUSB3301 USB Type-C Controller for Mobile Chargers and Power Adapters, Rev. 1.4, Nov. 2015—Firmenschrift (http://www.onsemi.com/PowerSolutions/product.do?id=FUSB3301, Stand: May 9, 2017).
Rogers, Andrew, "Microchip AN1953: Introduction to USB Type-C," *Microchip Technology Inc.*, 2015, 20 pages.
USB 3.0 Promoter Group, *Universal Serial Bus Type-C Cable and Connector Specification,* Hewlett-Packard Company, Intel Corporation, Microsoft Corporation, Renesas, STMicroelectronics, and Texas Instruments, Release 1.2, Mar. 25, 2016, pp. 1-221.
Great Britain Combined Search and Examination Report dated Mar. 16, 2018 of corresponding Great Britain Application No. GB1716631.5.
Examination Report dated Sep. 4, 2019, of counterpart Great Britain Application No. GB1716631.5.

* cited by examiner

INTERFACE ASSEMBLY THAT CONNECTS A PERIPHERAL DEVICE TO AN INTERFACE OF A HOST SYSTEM, AN ELECTRONIC DEVICE AND A METHOD OF SIGNALING

TECHNICAL FIELD

This disclosure relates to an interface assembly of a host system that connects a peripheral device to an interface, in particular a USB Type-C interface, with at least one supply line and at least one signaling line. The disclosure furthermore relates to a method of signaling a maximum available power output at an interface, in particular a USB Type-C interface, and to an electronic device, in particular a computer system with such an interface assembly to connect a peripheral device to the electronic device.

BACKGROUND

Interface assemblies that signal a maximum available power output to a peripheral device are known. In accordance with the USB Type-C Cable and Connector Specification, Release 1.2 of Mar. 25, 2016, it is possible to apply a pull-up resistor at a USB Type-C interface to signal a power profile to be set on the side of a peripheral device from the side of a host system. Depending upon what value the pull-up resistor has, the peripheral device recognizes the signaled power profile through the CC line.

In the USB Type-C Cable and Connector Specification, explicit values are provided for the three pull-up resistors for three standard power profiles of the USB Type-C connection (Table 415). For a standard USB Type-C power profile of approximately 4.5 W, a pull-up resistor value of approximately 56 kΩ is specified, for a power profile of 7.5 W a pull-up resistor value of approximately 22 kΩ, and for a power profile of 15 W a pull-up resistor value of approximately 10 kΩ is specified.

There can be performance bottlenecks in a host system due to power consumption of up to 15 W through an interface, which lead to a system crash. This is particularly the case when more than one interface is attached on a host system, and so a multiple of the 15 W is consumed, or when the host system comprises a power supply unit with a strictly-limited output power as, for example, occurs in so-called all-in-one PCs.

In those types of devices, the output power through the interfaces is strictly limited to a minimum. However, it is therefore not possible to operate peripheral devices at the interface requiring a higher output than the allowed minimum output. This is particularly disruptive to electronic devices whose rechargeable batteries are charged through a USB port. The charging process of a rechargeable battery takes considerably longer in a lower power output than with a higher output.

It could therefore be helpful to provide an interface assembly that resolves or minimizes the above-mentioned problems.

SUMMARY

I provide an interface assembly of a host system that connects a peripheral device to a USB Type-C interface, having at least one supply line and at least one signaling line, wherein one from among a plurality of different power profiles can be selected by the peripheral device by applying different analog control signals to the signaling line, a signaling circuit connects to the signaling line on a side of the host system, the signaling circuit, on the basis of at least one digital control signal, produces a predetermined analog control signal assigned to the at least one digital control signal and outputs it to the peripheral device via the signaling line and the at least one digital control signal is provided via a GPIO port of a control module of a system component of the host system, and the GPIO port is controlled by a BIOS.

I also provide a method of signaling a maximum available power output at a USB Type-C interface, including selecting a power profile on the side of a host system that signals a maximum available power output through the interface, producing at least one digital control signal based upon the selected power profile, the digital control signal being provided via a GPIO port of a control module of a system component of the host system, which GPIO port is controlled by a BIOS, producing an analog control signal through a signaling circuit of the host system based upon the at least one digital control signal, wherein the analog control signal is assigned to the selected power profile, outputting the analog control signal at the interface through a signaling line to a connected peripheral device, and setting the maximum possible power intake through the interface on the side of the peripheral device, based upon the analog control signal.

I further provide an electronic device including a computer system including at least one power supply unit, at least one system component, and at least one interface assembly that connects a peripheral device to a USB Type-C interface, having at least one supply line and at least one signaling line, wherein one from among a plurality of different power profiles can be selected by the peripheral device by applying different analog control signals to the signaling line, and a signaling circuit connects to the signaling line on a side of the electronic device, the signaling circuit, on the basis of at least one digital control signal, produces a predetermined analog control signal assigned to the at least one digital control signal and outputs it to the peripheral device via the signaling line and the at least one digital control signal is provided via a GPIO port of a control module of the at least one system component of the electronic device, which GPIO port is controlled by a BIOS.

LIST OF REFERENCE SYMBOLS

1 Interface assembly
2 Host system
3 Interface of the host system
4 Peripheral device
5 Cable
6 Supply line
7 Signaling line
8 Analog control signal
9 Readout circuit
10 System component (of the peripheral device)

11 Signaling circuit
12 Switching element
13 Signaling element
14 Control line
15 Voltage supply
16 System component (of the host system)
17 Transistor
18 Resistor
19 Interface controller
20 Analog intermediate signal
CC CC pin
S1-S5 method steps

DETAILED DESCRIPTION

I provide a generic interface assembly of a host system that connects a peripheral device to an interface, in particular a USB Type-C interface, having at least one supply line and at least one signaling line. By applying different analog control signals to the signaling line, one power profile from a plurality of different power profiles is signaled to the peripheral device. The interface assembly is characterized in that a signaling circuit connects to the signaling line on the side of the host system. The signaling circuit produces a predetermined analog control signal on the basis of at least one digital control signal and outputs this analog control signal through the signaling line to the peripheral device. The analog control signal is clearly assigned to the at least one digital control signal. The at least one digital control signal is provided through a GPIO port of a control module of a system component. In particular, this can be a GPIO port controlled via a BIOS system.

By providing the at least one digital control signal, it is possible to individually adjust the maximum available power output at a selected interface by the signaling circuit. For example, it is not necessary to make a change to the hardware of the host system when a maximum power output at an interface is to be changed. The control module can comprise a flash memory, on which so-called firmware is stored, through which the at least one digital control signal is produced. This enables a simple integration of the interface assembly into a host system. System components with control modules having GPIO ports are provided anyway in most systems, for which such an interface assembly may be relevant.

To implement such a circuit, in particular pull-up or pull-down resistors are suitable to set the required resistance values in connection with transistors.

It is furthermore advantageous to supply the signaling circuit with at least one auxiliary voltage used to produce the analog control signal.

The supply line may correspond to a supply line of a BUS voltage line, and the at least one signaling line corresponds to a CC line of a USB Type-C interface. The interface assembly is thus suitable for implementation at a USB Type-C interface, and conventional USB Type-C cables and plug systems can be used.

A USB Type-C interface may have two CC lines. One generic interface assembly connects to each CC line of the USB Type-C interface. It is an innovation of the USB Type-C interface that the plugs are constructed point-symmetrically and can be plugged in two possible orientations (each rotated by 180°). A USB Type-C socket has two CC pins, a USB Type-C plug but only one to register the orientation of the plug in the socket. The CC pins connect with the CC lines. If one generic signaling circuit connects to each CC line of the socket, this then guarantees the functionality of the interface assembly, independently of the orientation in which the plug was inserted into the socket.

The interface assembly may comprise two digital control inputs and one analog control output. The signaling circuit is configured to produce three analog control signals based on the switching states of the two digital control inputs. This allows signaling of the three power profiles (4.5 W, 7.5 W or 15 W) provided by the USB Type-C specification.

The signaling circuit may include an interface controller. In addition to the signaling of the output power, the interface controller is, e.g., used to configure the interface as a source (downstream facing port, DFP) or as a recipient (upstream facing port, UFP), or supply a connected cable with a cable voltage.

I also provide a method of signaling a maximum available power output at an interface, in particular a USB Type-C interface. The method includes the following steps:
  selecting a power profile on the side of the host system to signal a maximum available power output through the interface,
  producing at least one digital control signal based upon the selected power profile, the digital control signal being provided via a GPIO port of a control module of a system component of the host system, in particular through a GPIO port controlled by a BIOS,
  producing an analog control signal through a signaling circuit of the host system based upon the at least one digital control signal, wherein the analog control signal is assigned to the selected power profile,
  outputting the analog control signal at the interface through a signaling line to a connected peripheral device, and
  setting the maximum possible power intake via the interface on the side of the peripheral device based upon the analog control signal.

This method allows limiting the maximum power output at an interface and adjusting this limit to the individual requirements of a user. For example, under normal load, a host system of a user has an excessive power of 30 W, that can be accessed via two interfaces. In this case, the user can set a maximum available power output of 15 W at both interfaces, and operate and charge peripheral devices via both interfaces, respectively. However, if the user operates the host system under full load, an excessive output of only 20 W is available. However, if the user does not want to dispense with the peripheral devices or the charging of a device, the user can limit the maximum available power output at both interfaces to 7.5 W without huge efforts by this method. However, it is possible that the first peripheral device to be operated consumes a power of at least 10 W, and the user can set the maximum power output at the first interface to be 15 W and charge a second peripheral device via the second interface with a power of 4.5 W. This switch-over can be realized thanks to the above-described method.

The different power profiles can be selected by a user via a BIOS on the side of the host system. As an alternative, the power profile can be selected via a BIOS function or a firmware of a microcontroller automated by a certain event. This allows individually setting the power output via interfaces on the host system without making time-consuming changes to the hardware.

A signaling circuit with exactly two digital control signals is particularly suitable for the method. Exactly three different analog control signals, corresponding to three different power profiles, can be set via the signaling circuit by the different combination of the exactly two digital control signals.

I further provide an electronic device, in particular a computer system, including at least one power supply unit, at least one system component, and at least one interface assembly to connect a peripheral device to an interface, in particular a USB Type-C interface, having at least one supply line and at least one signaling line. By applying different analog control signals to the signaling line, one power profile from a plurality of different power profiles is signaled to the peripheral device. The interface assembly is characterized in that a signaling circuit connects to the signaling line on the side of the host system. The signaling circuit produces a predetermined analog control signal on the basis of at least one digital control signal and outputs this analog control signal through the signaling line to the peripheral device. The analog control signal is clearly assigned to the at least one digital control signal. The at least one digital control signal is provided through a GPIO port of a control module of a system component. In particular, this can be a GPIO port which is controlled via a BIOS system.

Further advantages of the interface assembly and the method are indicated in the appended claims as well as in the following description of examples. The examples are described using the attached figures. Different instances of components of the same type are indicated with alphabetic suffixes throughout the figures. Furthermore, the same reference numerals are used for elements having essentially the same function in FIGS. 1 to 3, but the elements do not necessarily have to be exactly identical in all details.

Figure 1:
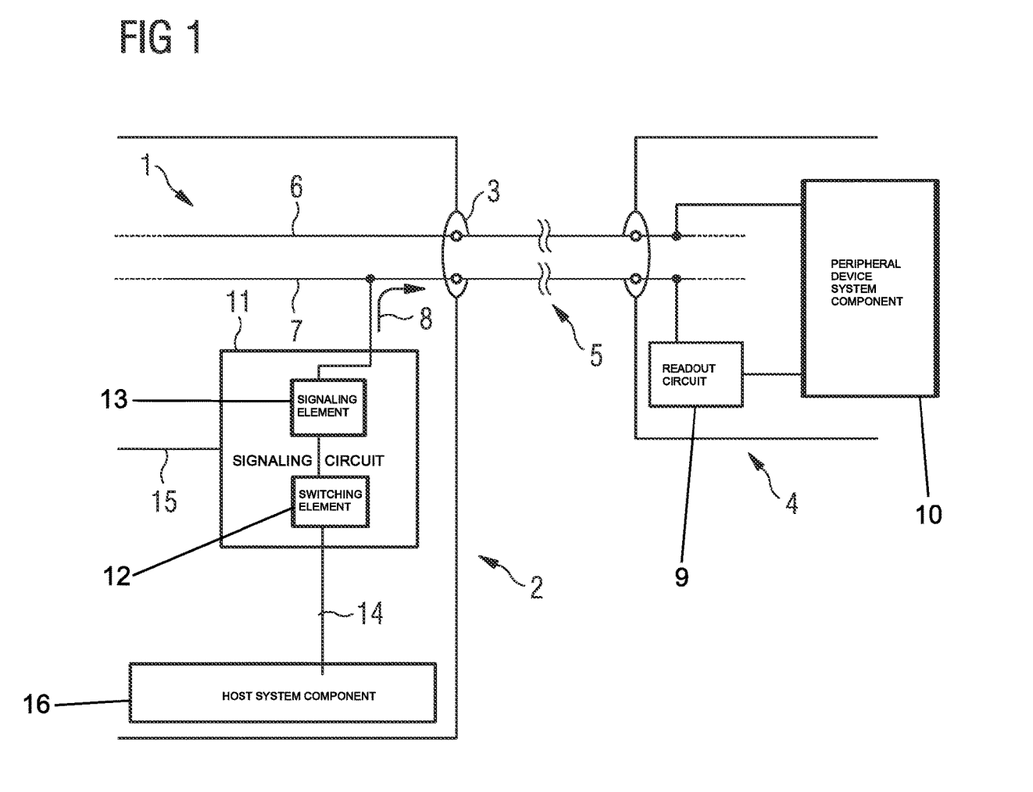
FIG. 1 is a schematic illustration of an interface assembly according to one example.

FIG. 1 shows a schematic illustration of an interface assembly 1 according to one example. A host system 2 in the form of a computer system comprises an external interface 3 to connect a peripheral device 4 to the host system 2. The host system 2 and the peripheral device 4 connect to one another via a cable 5, in this example a USB Type-C cable. The connection between host system 2 and peripheral device 4 includes a supply line 6 and a signaling line 7. In a USB Type-C connection, the supply line 6 is referred to as BUS voltage line ($V_{BUS}$) and the signaling line 7 is referred to as CC line. Further lines comprised in a USB Type-C connection are not shown in FIG. 2.

The host system 2 provides the peripheral device 4 with a supply voltage via the supply line 6. So that the peripheral device 4 knows how much power it is allowed to receive from the host system 2 via the supply line 6, the host system 2 sends an analog control signal 8 to the peripheral device 4 via the signaling line 7.

The peripheral device 4 includes a reader circuit 9 connected to the signaling line 7 and which can unambiguously assign the analog control signal 8 to a power profile. The reader circuit 9 connects to a system component 10 of the peripheral device 4, which, if required, limits the power output from the host system 2 via the supply line 6 to the signaled power profile.

The analog control signal 8 is produced in the host system 2 by a signaling circuit 11. This signaling circuit connects to the signaling line 7 and includes, in the illustrated example, a switching element 12 and a signaling element 13 electrically connected with one another. A digital control signal is applied to the switching element 12 via a control line 14. The signaling circuit 11 is supplied with an auxiliary voltage via a voltage supply 15. The output of the signaling circuit 11 via which the analog control signal 8 is output connects to the signaling element 13.

The digital control signal is produced in a system component 16 of the host system 2. The system component 16 of the host system 2 can, e.g., be a motherboard of the computer system. The digital control signal can be sent to the signaling circuit 11 through a control line 14 via a GPIO port of a control module of the motherboard, which is controlled, e.g., via a BIOS.

The digital control signal can have the logical switching states "high" and "low." Based upon these switching states, the switching element 12 is controlled such that the auxiliary voltage is set via the signaling element 13 such that various voltages are output as analog control signals 8, signalizing different power profiles to the peripheral device 4 in an unambiguous manner.

FIG. 1 shows an example in which the interface assembly 1 is attached to an external USB Type-C interface 3. An interface assembly 1 as described above may however also readily be used for other external or internal interfaces 3 through which power can be output. Peripheral devices 4 can be consumers outside or inside the host system 2.

Figure 2:
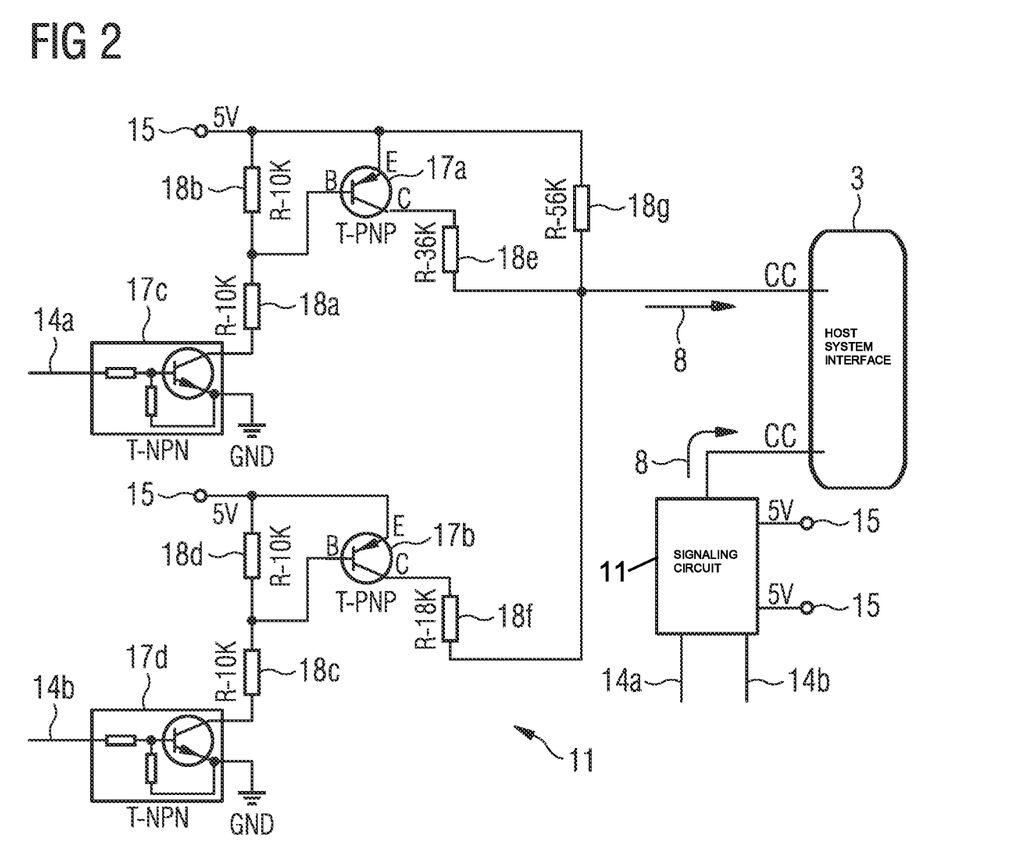
FIG. 2 is a circuit diagram of a signaling circuit according to one example.

FIG. 2 shows a detailed circuit diagram of a possible implementation of the signaling circuit 11. FIG. 2 further shows a USB Type-C interface 3, to which the signaling circuit 11 is connected. Since a USB Type-C interface 3 comprises two CC pins CC, to which CC lines connect, one signaling circuit 11 connects to each CC pin CC of the USB Type-C interface 3 in FIG. 2. This enables a signaling of the power profile regardless of an orientation of a USB Type-C plug on the interface 3. Only one of the two signaling circuits 11 is described in detail here.

The signaling circuit 11 comprises two voltage supplies 15, via which the signaling circuit 11 is supplied with auxiliary voltages, the inputs of two control lines 14a, 14b for two digital control signals and one output for analog control signals 8.

In this example, the signaling circuit 11 comprises two switching elements 12, in the form of PNP transistors 17a and 17b. The at least one signaling element 13 is implemented here as a pull-up resistor through a system of resistors 18a to 18f. In this example, resistors 18a, 18b, 18c and 18d have resistance values of 10 kΩ, 18e has a resistance value of 36 kΩ, 18f has a resistance value of 18 kΩ, and 18g has a resistance value of 56 kΩ. Resistors 18a and 18c each serve to limit the base current of the transistor 17a and 17b, respectively. The resistors 18b and 18d, respectively, ensure that the base of the transistor 17a and 17b, respectively, will not float and reliably blocks. The transistors 17a and 17b, respectively, switch the pull-up resistors 18e and 18f, respectively. Two transistors 17c and 17d are used to control the base current of the transistors 17a and 17b, respectively. In this example, the auxiliary voltages 15 are in each case 5 Volt. In other examples, auxiliary voltages of 3.3 V can also be used in accordance with the USB Type-C specification. The resistance values for signaling the power profiles are then adjusted in accordance with the USB Type-C specification.

In this example, different analog control signals 8 can be set as follows via the digital control signals on the control lines 14, 14b:

| Power profile | Control line | Logical value |
| --- | --- | --- |
| 1 | 14a | Low |
|   | 14b | Low |
| 2 | 14a | High |
|   | 14b | Low |

| Power profile | Control line | Logical value |
| --- | --- | --- |
| 3 | 14a | High |
|   | 14b | High |

In this way, three different analog control signals 8 are produced in the signaling circuit 11 via two digital control signals on the control lines 14a, 14b. As will be explained in greater detail, in this example, the analog control signals 8 correspond to the specification of the USB Type-C implementation. Thus, peripheral devices 4 that also fall under this specification can unambiguously recognize how much power they are allowed to tap through the supply line 6 at the interface 3 of the host system 2 based upon the analog control signals 8 received through the signaling line 7.

As described above, the specification of the USB Type-C connection provides three default power profiles:
 1. First power profile 4.5 W: 900 mA at 5 Volt
 2. Second power profile 7.5 W: 1.5 A at 5 Volt
 3. Third power profile 15 W: 3.0 A at 5 Volt.

At an auxiliary voltage of 5 Volt, a pull-up resistor of 56 kΩ is used for the first power profile, a pull-up resistor of 22 kΩ is used for the second power profile, and a pull-up resistor of 10 kΩ is used for the third power profile. These switching values are achieved by a corresponding control through the digital control signals in the present circuit via the transistors 17 and 18.

The circuit has a total resistance of 56 kΩ when the digital control signal has the switching state "low" on both control lines 14a, 14b. In this case, a voltage drops only at the resistor 18g. Using these settings, the first profile (4.5 W) is signaled to the peripheral device 4 via the output for the analog control signal 8. If the control state "high" is applied to the digital control signal at control line 14a and the control state "low" is applied to the digital control signal at control line 14b, the circuit achieves a total resistance of approximately 22 kΩ through a parallel connection of the resistors 18e and 18g. This signalizes the second power profile (7.5 W) to the peripheral device 4. The third power profile (15 W) can be signaled to the peripheral device 4 by applying the "high" state to both digital control signals on the control lines 14a, 14b. In this case, the present circuit has an overall resistance of approximately 10 kΩ. This resistance value results from a parallel connection of the resistor 18f with resistors 18e and 18g, which are connected in parallel.

Figure 3:
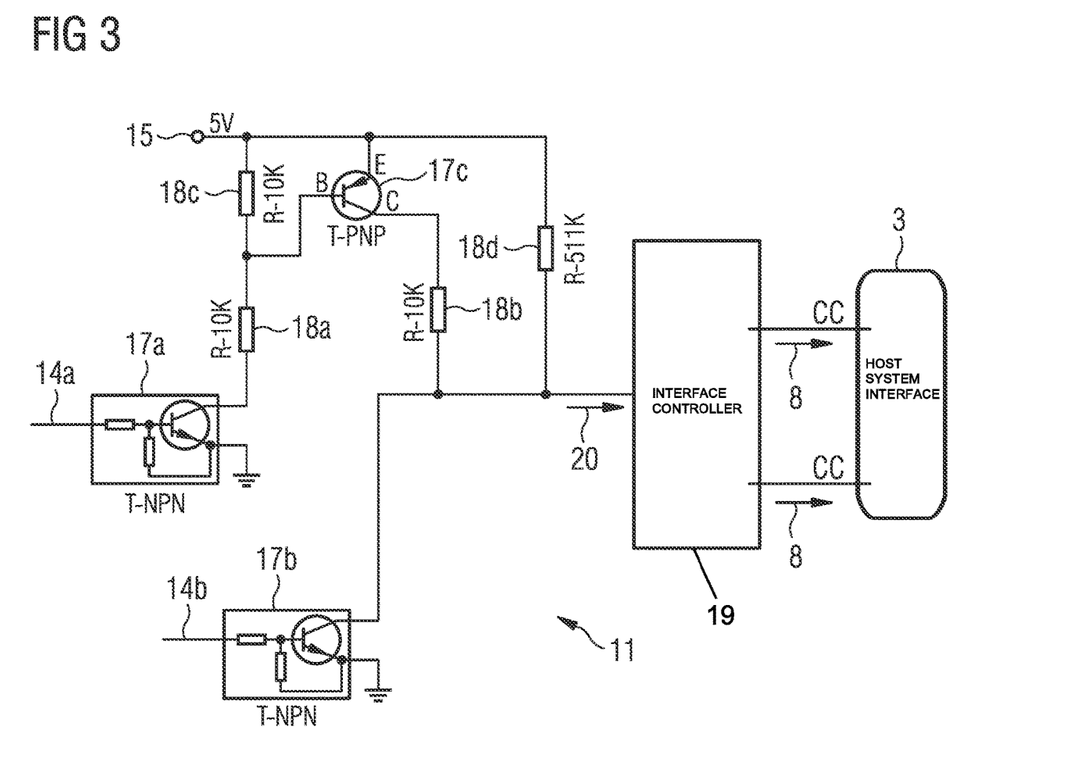
FIG. 3 is a circuit diagram of a signaling circuit according to a further example.

FIG. 3 shows an alternative example of a signaling circuit 11. The circuit of FIG. 3 is formed such that the signaling circuit 11 includes an interface controller 19, in this case a TUSB321AI of Texas Instruments, which according to the USB Type-C specification can configure, inter alia, the interface 3 as a source (DFP) or as a recipient (UFP) and supply active cables 5 with a cable voltage $V_{CONN}$. The system of transistors 17 and resistors 18 produces different analog intermediate signals 20 pulled to the analog control signals 8 required to signal the power profile by the interface controller 19, which is connected to the interface 3. The interface controller 19 includes two CC pins CC connected to both CC pins of a USB Type-C interface 3. This example only comprises one signaling circuit 11.

In this case, the following resistance values are used for signaling circuit 11 to produce the corresponding analog intermediate signals 20, which are transformed into the corresponding analog control signals 8 by the interface controller 19 to signalize the selected power profiles:

1. First power profile 4.5 W: grounded
 2. Second power profile 7.5 W: 500 kΩ
 3. Third power profile 15 W: 10 kΩ.

These resistance values are achieved in the signaling circuit 11 in FIG. 3 through the following logical values on the control lines 14a and 14b:

| Power profile | Control line | Logical value |
| --- | --- | --- |
| 1 | 14a | Low |
|   | 14b | High |
| 2 | 14a | Low |
|   | 14b | Low |
| 3 | 14a | High |
|   | 14b | Low |

The described example can also be used, when additionally the voltage $V_{CONN}$ is provided via the interface 3. This voltage is used to supply electronically-marked cables 5 and output to the cable 5 through the CC pin of the interface 3, which pin is not connected with the CC line of the cable 5.

A plurality of further examples of the signaling circuit 11 to signal the power profile is possible. The above-described effects can be achieved depending on voltage levels, resistance values as well as different switching states.

Figure 4:
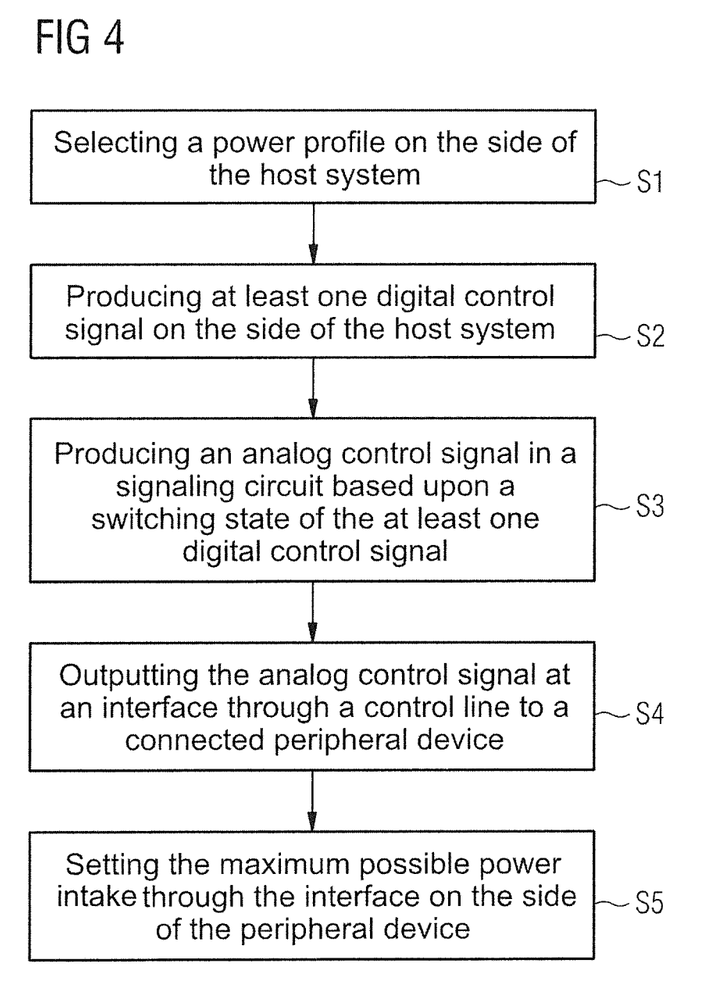
FIG. 4 is a flowchart of a method of signaling a maximum available power output through an interface assembly of a host system to a peripheral device.

FIG. 4 shows a flowchart for a method of signaling a maximum available power output through an interface 3 from a host system 2 to a peripheral device 4.

In a first step S1, a selection of a power profile is effected on the side of the host system 2. This selection can be made, e.g., by a user via a Binary Operating System BIOS. Alternatively, the selection can be made via a BIOS function or a firmware of a microcontroller automated by a certain event.

A power profile that enables high power output through an interface 3 can be selected to use peripheral devices 4 requiring high power for operation thereof, or, e.g., a connected rechargeable device in a faster manner. A power profile that permits low power output via the interface 3 can be selected when, e.g., multiple peripheral devices 4 connect to a host system 2 to prevent an overload of the host system 2.

Based upon the selection of the power profile, in a second step S2, at least one digital control signal is produced by a system component 16 of the host system 2. This at least one digital control signal can be provided, e.g., via a GPIO port of a control module of the system component 16 of the host system 2 and is sent to a signaling circuit 11 through at least one control line 14. In the examples described in FIGS. 2 and 3, e.g., two digital control signals are produced since there are two control lines 14a, 14b for the digital control signals. The at least one digital control signal may have the switching states "high" and "low," respectively.

In a step S3, analog control signals 8 are produced in the signaling circuit 11 based upon the switching states of the at least one digital control signal.

In a step S4, the analog control signals 8 are output at the interface 3 through a signaling line 7 and sent to the connected peripheral device 4. The peripheral device 4 includes a readout circuit 9 for the evaluation of the analog control signal 8. Such a readout circuit is contained in devices having a USB Type-C interface due to the USB Type-C specification.

In a step S5, a maximum possible power intake, on the side of the peripheral device 4 through the interface 3 of the host system 2, is set by a system component 10 of the peripheral device 4.

Although the apparatus and methods have been described in connection with specific forms thereof, it will be appreciated that a wide variety of equivalents may be substituted for the specified elements described herein without departing from the spirit and scope of this disclosure as described in the appended claims.

The invention claimed is:

1. An interface assembly of a host system that connects a peripheral device to an interface, having at least one supply line and at least one signaling line, wherein one from among a plurality of different power profiles, the power profile signaling a maximum available power output through the interface, can be selected by the host system by applying different analog control signals to the signaling line,
a signaling circuit connects to the signaling line on a side of the host system, and
the signaling circuit, on the basis of at least one digital control signal, produces a predetermined analog control signal assigned to the at least one digital control signal and outputs it to the peripheral device via the signaling line the at least one digital control signal is provided via a GPIO port of a control module of a system component of the host system, the signaling circuit is a discrete circuit including at least one pull-up or one pull-down resistor and at least on transistor, and the discrete circuit is supplied with at least one auxiliary voltage via at least one voltage supply and the different analog control signals are various voltages produced from the auxiliary voltage by the discrete circuit by adjusting an overall resistance of the discrete circuit.

2. The interface assembly according to claim 1, wherein the at least one supply line corresponds to a BUS voltage ($V_{BUS}$) and the at least one signaling line corresponds to a CC line of a USB Type-C interface.

3. The interface assembly according to claim 2, wherein the USB Type-C interface comprises 2 CC lines, and one generic signaling circuit each connects to both CC lines of the USB Type-C interface.

4. The interface assembly according to claim 1, comprising two control lines for two digital control signals and an analog signal output, and is configured to produce three analog control signals based upon the switching states of the two digital control signals.

5. The interface assembly according to claim 4, wherein the three analog control signals each signal a possible maximum power output of 4.5 W, 7.5 W, or 15 W through the interface.

6. A method of signaling a maximum available power output at an interface, comprising:
selecting a power profile on the side of a host system that signals a maximum available power output through the interface,
producing at least one digital control signal based upon the selected power profile, the digital control signal being provided via a GPIO port of a control module of a system component of the host system,
producing an analog control signal through a discrete signaling circuit of the host system based upon the at least one digital control signal, wherein the analog control signal is assigned to the selected power profile, the discrete signaling circuit includes at least one pull-up or one pull-down resistor and at least one transistor, the discrete signaling circuit is supplied with at least one auxiliary voltage via at least one voltage supply, and the analog control signal is a voltage produced from the auxiliary voltage by the discrete signaling circuit by adjusting an overall resistance of the discrete signaling circuit,
outputting the analog control signal at the interface through a signaling line to a connected peripheral device, and
setting the maximum possible power intake through the interface on the side of the peripheral device, based upon the analog control signal.

7. The method according to claim 6, wherein the different power profiles can be selected by a user through a BIOS on the side of the host system, be set via a BIOS function or a firmware of a microcontroller automated through a certain event.

8. The method according to claim 6, wherein the signaling circuit receives exactly two digital control signals through exactly two control lines and exactly three different analog control signals, corresponding to three different power profiles, can be set via the signaling circuit through different combinations of the exactly two digital control signals.

9. An electronic device comprising:
at least one power supply unit,
at least one system component, and
at least one interface assembly that connects a peripheral device to an interface, having at least one supply line and at least one signaling line, wherein one from among a plurality of different power profiles, the power profile signaling a maximum available power output through the interface, can be selected by the electronic device by applying different analog control signals to the signaling line, and
a signaling circuit connects to the signaling line on a side of the electronic device,
the signaling circuit, on the basis of at least one digital control signal, produces a predetermined analog control signal assigned to the at least one digital control signal and outputs it to the peripheral device via the signaling line and the at least one digital control signal is provided via a GPIO port of a control module of the at least one system component of the electronic device, the signaling circuit is a discrete circuit including at least one pull-up or one pull-down resistor and at least one transistor, and the discrete circuit is supplied with at least one auxiliary voltage via at least one voltage supply and the different analog control signals are various voltages produced from the auxiliary voltage by the discrete circuit by adjusting an overall resistance of the discrete circuit.

10. The interface assembly according to claim 1, wherein the digital control signal is provided via a GPIO port controlled by a BIOS.

11. The method according to claim 6, wherein the digital control signal is provided via a GPIO port controlled by a BIOS.

12. The electronic device according to claim 9, wherein the digital control signal is provided via a GPIO port controlled by a BIOS.

13. The interface assembly according to claim 1, wherein the interface is a USB Type-C interface.

14. The method according to claim 6, wherein the interface is a USB Type-C interface.

15. The electronic device according to claim 9, wherein the interface is a USB Type-C interface.

16. The electronic device according to claim 9, which is a computer system.

* * * * *